United States Patent
Roy et al.

(10) Patent No.: US 10,038,662 B2
(45) Date of Patent: Jul. 31, 2018

(54) AUTOMATION OF MATCHING OF SHORT MESSAGE TAGS TO CONTENT

(71) Applicant: Dell Products L.P., Round Rock, TX (US)

(72) Inventors: Mainak Roy, Kolkata (IN); Deepak Ravishankar, Bangalore (IN); Sharmad S. Naik, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 215 days.

(21) Appl. No.: 14/849,822

(22) Filed: Sep. 10, 2015

(65) Prior Publication Data

US 2017/0078237 A1   Mar. 16, 2017

(51) Int. Cl.
| | | |
|---|---|---|
| G06F 15/16 | (2006.01) | |
| H04L 12/58 | (2006.01) | |
| G06F 17/30 | (2006.01) | |
| H04L 29/08 | (2006.01) | |

(52) U.S. Cl.
CPC ........ *H04L 51/32* (2013.01); *G06F 17/30864* (2013.01); *H04L 67/22* (2013.01); *H04L 51/38* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 9,361,322 | B1* | 6/2016 | Dutta | G06Q 30/08 |
| 2015/0293987 | A1* | 10/2015 | Andreu | G06F 17/30598 |
| | | | | 707/754 |
| 2015/0293991 | A1* | 10/2015 | Andreu | G06F 17/30598 |
| | | | | 707/738 |
| 2015/0348097 | A1* | 12/2015 | Andrianakou | G06F 17/30312 |
| | | | | 705/14.49 |
| 2016/0026687 | A1* | 1/2016 | Aitchison | G06F 17/30654 |
| | | | | 707/694 |
| 2016/0088030 | A1* | 3/2016 | Banatwala | G06F 17/30867 |
| | | | | 715/753 |
| 2016/0088121 | A1* | 3/2016 | Banatwala | G06F 17/30867 |
| | | | | 709/204 |
| 2016/0196353 | A1* | 7/2016 | Ravishankar | G06Q 50/01 |
| | | | | 707/710 |
| 2016/0269344 | A1* | 9/2016 | Anders | H04L 51/32 |
| 2016/0328752 | A1* | 11/2016 | Andrianakou | G06Q 30/0241 |
| 2016/0359993 | A1* | 12/2016 | Hendrickson | H04L 67/22 |
| 2017/0011408 | A1* | 1/2017 | Ravishankar | G06Q 30/0201 |
| 2017/0078237 | A1* | 3/2017 | Roy | H04L 51/32 |
| 2017/0103130 | A1* | 4/2017 | Roy | G06Q 50/01 |
| 2017/0118161 | A1* | 4/2017 | Ravishankar | H04L 51/32 |

* cited by examiner

*Primary Examiner* — Alicia Baturay
(74) *Attorney, Agent, or Firm* — Terrile, Cannatti, Chambers & Holland, LLP; Stephen A. Terrile

(57) ABSTRACT

A system, method, and computer-readable medium for providing a short message tag identification tool which performs a short message tag identification operation which automatically generates a short message tag identifier based upon short message content. In certain embodiments, the short message tag identification operation identifies trending short message tag identifiers and automatically generates a preferred short message tag identifier taking into account trending short message tag identifiers.

12 Claims, 6 Drawing Sheets

AUTOMATION OF MATCHING OF SHORT MESSAGE TAGS TO CONTENT

BACKGROUND OF THE INVENTION

Field of the Invention

The present invention relates to information handling systems. More specifically, embodiments of the invention relate to automation of matching of short message tags to content.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to user information handling systems to communicate with groups of users by delivering short messages. For example, many companies have a large presence over social media platforms. As an example, Twitter® has become an increasingly popular platform for delivering short messages to an associated group of users. With a social media platform, short message identification is often accomplished via a short message tag identifier. In certain social media platforms, this short message tag identification is accomplished using metadata such as tag data (e.g., identified as #tag (pronounced "hashtag")). It is becoming increasingly well known to search for information based upon a short message tag identifier.

Accordingly, it can be challenging to associate a particular short message tag with content. However, a challenge can arise for a company attempting to provide information via a short message. Selection of an appropriate short message tag identifier can have an impact on the promulgation of the information contained within the short message. For example, attempting to promulgate the information via two short message tag identifiers can cause the engagement with the short message to actually drop (e.g., it has been suggested that the engagement level can drop by as much as 17 percent with the use of two short message tag identifiers).

Accordingly, it would be desirable to automate the generation of a short message tag identifier with the matching of the short message tag identifier with the content of the short message.

SUMMARY OF THE INVENTION

A system, method, and computer-readable medium are disclosed for providing a short message tag identification tool which performs a short message tag identification operation which automatically generates a short message tag identifier based upon short message content. In certain embodiments, the short message tag identification operation identifies trending short message tag identifiers and automatically generates a preferred short message tag identifier taking into account trending short message tag identifiers.

More specifically, in certain embodiments, the short message tag identification operation automatically generates the short message tag identifier based upon short message content, trending short message tag identifiers as well as other short message tag identifiers associated with one or more social media platforms. Additionally, in certain embodiments, the short message tag identification operation takes into account other short message tag identifiers being generated by a particular company so as to provide short message tag identifier synergy across a plurality of company owned short message accounts. Additionally, in certain embodiments, the generated short message tag identifiers maintain a consistent resemblance across a plurality of company owned short message identifiers. Additionally, in certain embodiments, the generated short message tag identifiers maintain a consistent resemblance when being used to generate short messages associated with company specific content such as content generated by employees and/or customers of the company. Additionally, in certain embodiments, the generated short message tag identifiers take into account and are consistent across a particular brand of a company.

Certain embodiments of the invention include the recognition that it is important for a company to carefully select a short message tag identifier. A preferable short message tag identifier would be specific regarding the content of the short message. Additionally, a preferable short message tag identifier would be unique to the business and reliable (i.e., where the short message identifier conforms to predefined company requirements). Additionally, association of a preferable short message tag identifier with content would take into account trending short message tag identifiers.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
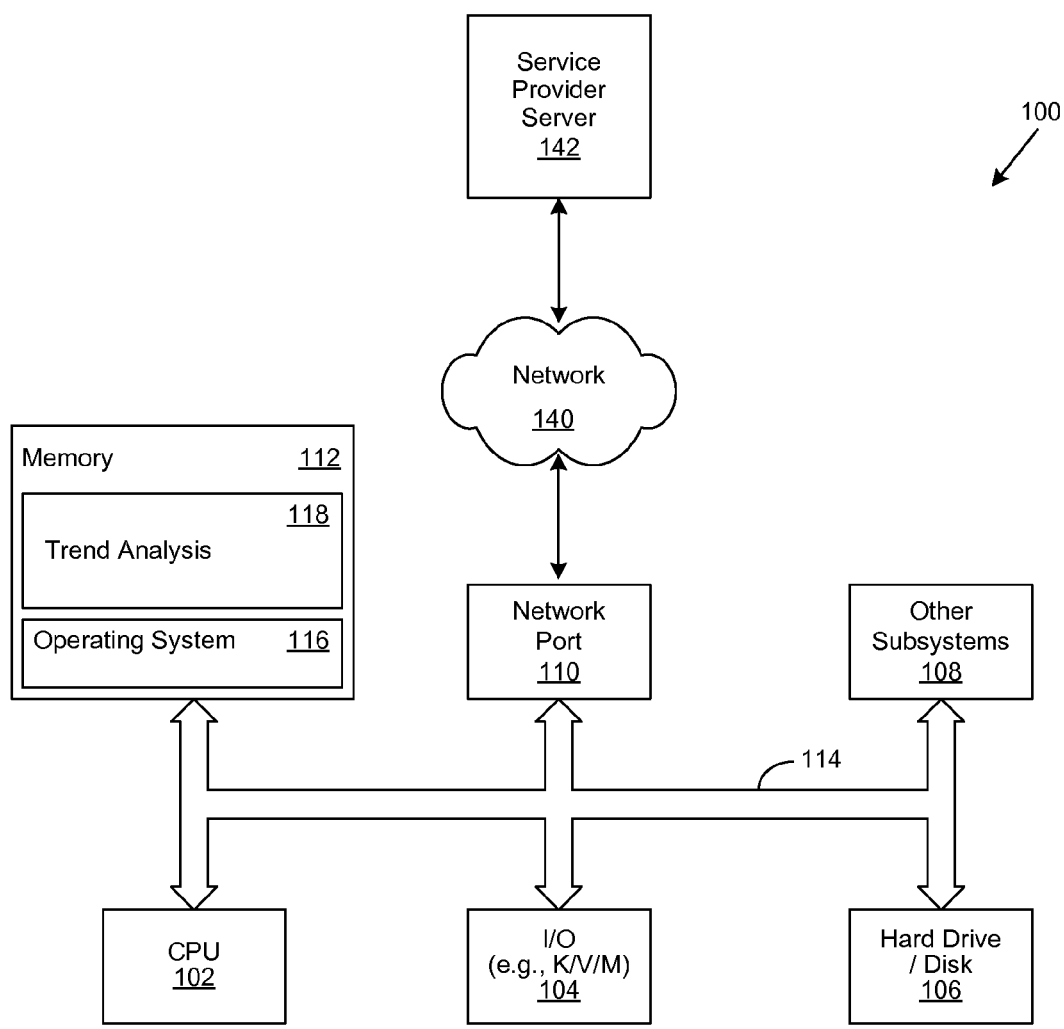
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a short message module 118.

The short message module 118 performs a short message tag identification operation which automatically generates a short message tag identifier based upon short message content. In certain embodiments, the short message tag identification operation identifies trending short message tag identifiers and automatically generates a preferred short message tag identifier taking into account trending short message tag identifiers.

More specifically, in certain embodiments, the short message tag identification operation automatically generates the short message tag identifier based upon short message content, trending short message tag identifiers as well as other short message tag identifiers (e.g., identifiers which may be of importance to a company) associated with one or more social media platforms. Additionally, in certain embodiments, the short message tag identification operation takes into account other short message tag identifiers being generated by a particular company so as to provide short message tag identifier synergy across a plurality of company owned short message accounts. Additionally, in certain embodiments, the generated short message tag identifiers maintain a consistent resemblance across a plurality of company owned short message identifiers. In certain embodiments, the consistent resemblance uses variations of the same product name for short message tag identifiers relating to that product. Additionally, in certain embodiments, the generated short message tag identifiers maintain a consistent resemblance when being used to generate short messages associated with company specific content such as content generated by employees and/or customers of the company. Additionally, in certain embodiments, the generated short message tag identifiers take into account and are consistent across a particular brand of a company. For example, a short message tag identifier of #XPS 13 may be used to represent a particular product across a plurality of social media platforms.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
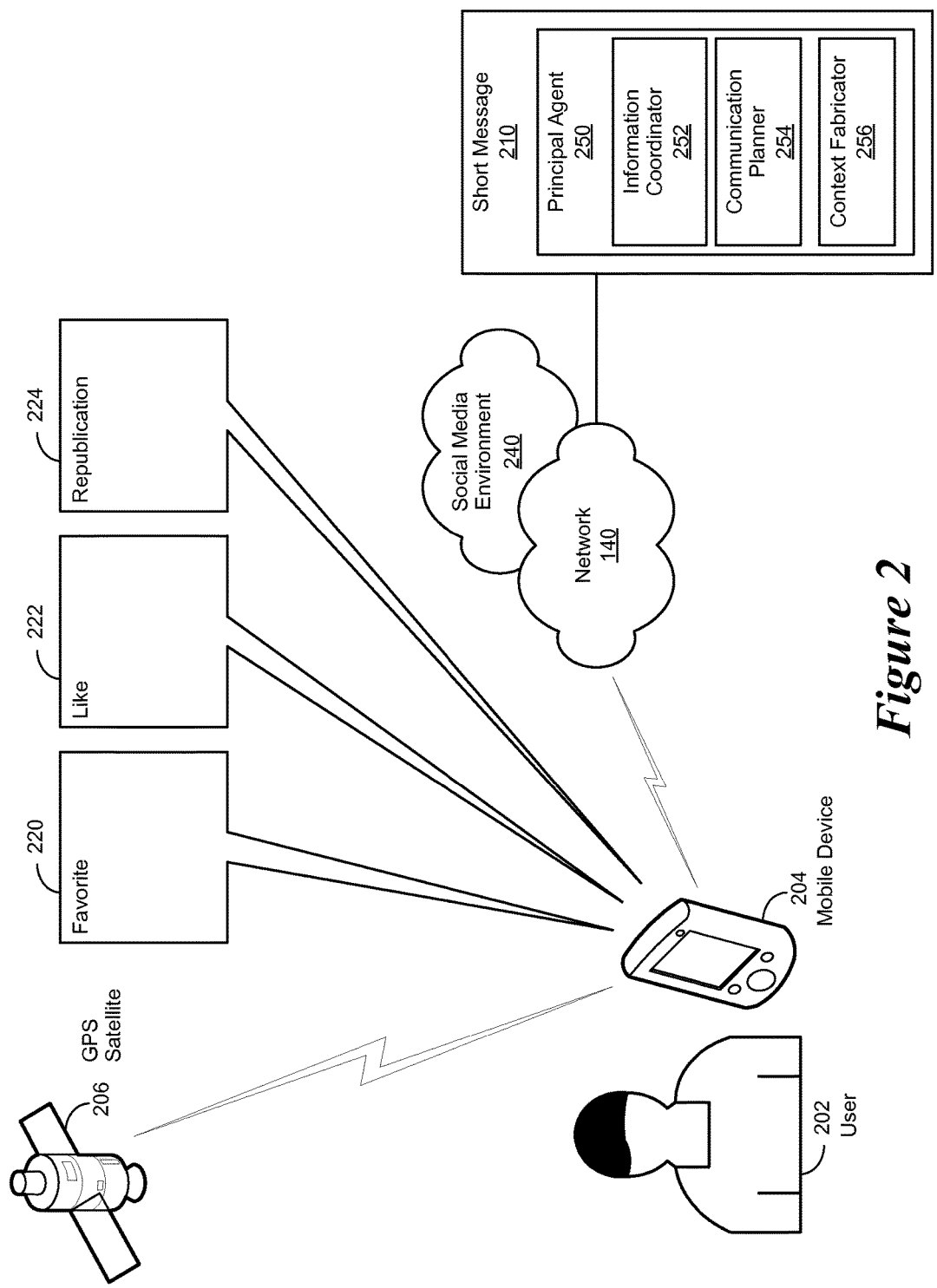
FIG. 2 shows a block diagram of a short message tag identification system operational flow.

FIG. 2 shows a simplified block diagram of the delivery of a short message implemented in accordance with an embodiment of the invention. As used herein, a short message broadly refers to a short message associated with a social media environment. In this and other embodiments, these short messages may be delivered to a mobile device 204 being used by a user 202.

As used herein, a mobile device 204 refers to wireless devices such as mobile telephones, smart phones, personal digital assistants (PDAs), tablet computers, handheld or laptop computers, and similar devices that have telecommunications capabilities. In various embodiments, the mobile device 204 is used to exchange information between a user 202 and a short message tool 210, described in greater detail herein through the use of a network 140. In certain embodiments, the network 140 is likewise used by the mobile device 204 to exchange information between the user 202 and one or more social media environments 240.

In various embodiments, the network 140 may be a public network, such as the Internet, a physical private network, a virtual private network (VPN), a wireless network, or any combination thereof. In certain embodiments, the wireless network may be a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Other embodiments may include the implementation of other 3G technologies, including evolution-data optimized (EVDO), IEEE 802.16 (WiMAX), wireless broadband (Wi-Bro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

In various embodiments, the short message may be delivered in the form of a Short Message Service (SMS) message, a Multimedia Messaging Service (MMS) message, or a Tweet® message, provided by Twitter, Inc. of San Francisco, Calif. Skilled practitioners of the art will be familiar with SMS messages, which are a text messaging service component of telephone, Web, or mobile communication systems. SMS messages are limited to a total of 160 seven-bit characters and use a stateless communications protocol, meaning every SMS message is considered independent of other messages. In certain embodiments, SMS messages may be concatenated to provide larger amounts of content within the cognitive short message. While SMS is typically implemented for person-to-person (P2P) messaging, it may also be implemented in certain embodiments for application-to-person (A2P) messaging. As an example, the short message tool 210 may be implemented to deliver a short message to a user's 202 mobile device 204.

Those of skill in the art will likewise be familiar with MMS messages, which provide a way to send messages that include multimedia content to and from mobile devices 204. Currently, the most popular use of MMS is to send photographs from camera-equipped mobile devices 204. However, MMS may implemented in various embodiments to deliver news and entertainment content as part of a cognitive short message. In certain embodiments, MMS may likewise be implemented to deliver scannable coupon codes, product images, audio, videos and other information as part of a cognitive short message.

Twitter, Inc. will likewise be familiar to skilled practitioners of the art as a social media service that allow users to send and receive short, 140 character messages, known as Tweets®. Currently, registered users of Twitter can read and post Tweets®, but unregistered users are only allowed to receive them. In various embodiments, Twitter can be accessed through a website interface, SMS, or an application implemented on a mobile device 204. In these and other embodiments, Twitter users may subscribe to Tweets® from other users, which is known as "following." In certain embodiments, Tweets® may be implemented to accommodate multimedia content. In these embodiments, the multimedia content may be provided as part of a cognitive short message delivered as a Tweet®.

Short message operations are initiated by first selecting a target user 202 and then performing ongoing monitoring operations to monitor their social media interactions, their physical location, and the current date and time. If a social media interaction 220 by the target user 202 is detected, then data associated with the social media interaction is captured. For example, the social media interaction data may include a user post 220 to a social media environment 240 (e.g., a tweet). The user post may take the form of a favorite indication within a short message 220, a like indication within a short message 222 or a republication (also referred to as a forwarding) short message 224 (e.g., a retweet). Additionally, in certain embodiments, the location of the user 202 may be determined through the use of Geographical Positioning System (GPS) satellite 206 data acquired by the user's mobile device 204. Some or all of the information gathered when performing short message operations may be used when performing a short message tag identification operation. For example, in certain embodiments, trending information may be derived from information obtained from the short message operations.

When performing a short message tag identification operation, the short message tag identification system 250 collates trending tag identifiers which are in some way related to a company's business. These trending tag identifiers are stored within a short message tag identification information repository and are used by the short message tag identification system to automatically generate tag identifiers which are related to the company's business. Such a short message tag identification system allows a user associated with the company to identifier tag identifiers which will likely provide increased visibility to content associated with the short message so as to increase the visibility of any information, such as product information, that the company desires to promulgate.

In various embodiments, the short message tag identification system 210 includes some or all of the functionality of the short message tag identification module 118. In certain embodiments, the short message tag identification system 210 includes a principal agent 250. The principal agent 250 further includes one or more of an information coordinator module 252, a communication planner module 254 and a context fabricator module 256.

In various embodiments, the principal agent 250 is associated with and executes on a server type information handling system such as information handling system 100. The server type information handling system may be internal to a particular company or may be associated in some way with a particular company such as by executing on a virtual machine which is remotely located but is controlled by the company. The principal agent 250 communicates with and receives information from a social media platform such as the Twitter social media platform. In certain embodiments, the principal agent accesses the social media platform via a predefined set of application program interfaces (APIs) such as the streaming APIs available from certain social media platforms.

With certain social media platforms, the streaming APIs provide access to some or all of short message public streams, short message user streams and short message site streams. While these streams are intended for servers which connect to the social media platform on behalf of many users, the principal agent 250 stands in for a user in the present invention and becomes the user of the data.

When the principal agent 250 collects the information from the various streams, the information from the various streams is stored within a database which contains any trends and relevant tag identifiers for products that are associated with the company, e.g., products within a particular product portfolio. The combination of the database and the server type information handling system function as a trending server. In certain embodiments, the principal agent 250 can also interact with certain line of business (LOB) specific filters to categorize the collected tag identification information and trending information. The categorized information may be stored within a particular catalog file which is associated with a particular subset of products of a company, e.g., a subset of products associated with a particular line of business of the company. The principal agent collects the information on an ongoing basis and updates the database as well as the catalog file accordingly. Additionally, whenever a new tag identifier is generated, information such as trending information, is also included within the database and the appropriate catalog file.

In certain embodiments, various user devices 204 provide an interface with the social media platform. These user devices 204 fetch information from the database and/or the catalog file on a regular basis (e.g., periodically) so as to have access to the information relating to trending tag identifiers. The user 202 may be an administrative user who can schedule the process of obtaining this information. The user 202 can configure the user device 204 to collect any automatically generated tag identifiers which are generated by the short message tag identification system 210 on any desired time period (e.g., every minute, hourly, daily, weekly, etc.). The user 202 can also collect information stored to the database by the principal agent 250 as well as any catalog file generated by the principal agent on any desired time period.

Using this information, a user 202 can now use the automatically generated short message tag identifier when posting to a particular social media platform. The user 202 can also use this information to join an ongoing trend within one or more social media platforms.

The information coordinator module 252 is the initial portion of the principal agent 250 which interacts with a particular social media platform. The information coordinator module 252 monitors the social media platform for trending topics which are of interest to the company (e.g., the trending topics are applicable to a particular company or product of a company). For the purposes of this disclosure, trending topics refers to an identification of subjects which many users across a particular social media platform are generating short message within a short amount of time (e.g., over a particular day or week). The more short messages relating to a particular topic, the more this topic is "trending." As is known in the art, certain algorithms may be used to identify recent trends and/or trending topics. For any identified trending topics which of interest to the company, the information coordinator obtains the tag identifiers which are associated with the trend. In certain embodiments, the tag identifiers are used to describe the trends in some way.

After the tag identifiers are obtained, then the information coordinator 252 analyzes the tag identifiers based upon keywords and existing tag identifiers used by the company. The keywords and existing tag indenters are contained within a company storage repository. In certain embodiments, the keywords and existing tag identifiers may be further categorized such as by product category or line of business. By performing such an analysis, the information coordinator 252 identifiers which trending tag identifiers are applicable to which product and/or line of business.

The communication planner module 254 provides the functionality to provide identified trending tag identifier information from a server executing the principal agent 250 to a user device 204. When communicating with a user device 204, the communication planner module 254 interacts with the principal agent 250 to collect the identified trending tag identifier information and provide this identified trending tag identifier information to the user device 204. The communication planner module 254 also confirms that the identifier trending tag identifier information is the latest available information. After the identifier trending tag information is provided to the user device 204, the communication planner 254 updates the company storage repository to include this information.

The communication planner module 254 also applies the updated trending information to the user device 204 to guide the user 202 towards certain desirable tag identifiers. Providing this trending information the user 202 helps assure that content generated by the user 202 reaches a desired audience.

The context fabricator module 256 interacts with a content area which is presented within a browser when accessing a social media platform. In certain embodiments, the content area includes a text box. Whenever the context fabricator module 256 detects any content being applied to the content area, the context fabricator module 256 initiates a matching operation to determine whether any of the applied content corresponds to certain predefined keywords. Upon such a detection, the context fabricator 256 automatically provides the user 202 with a best fort trending tag denier corresponding to the content. Because the principal agent 256 always includes the most current trending tag identifier information, the context fabricator provides the user with a best possible fit tag identifier corresponding to the applied content.

In certain embodiments, the context fabricator 256 automatically generates a plurality of desirable tag identifiers and prompts the user 202 to select from the plurality of desirable tag identifiers. Also in certain embodiments, the context fabricator 256 provides an indication of a most desirable tag identifier from the plurality of tag identifiers. In certain embodiments, this most desirable tag identifier corresponds to the tag identifier which includes the highest trending indications.

Figure 3:
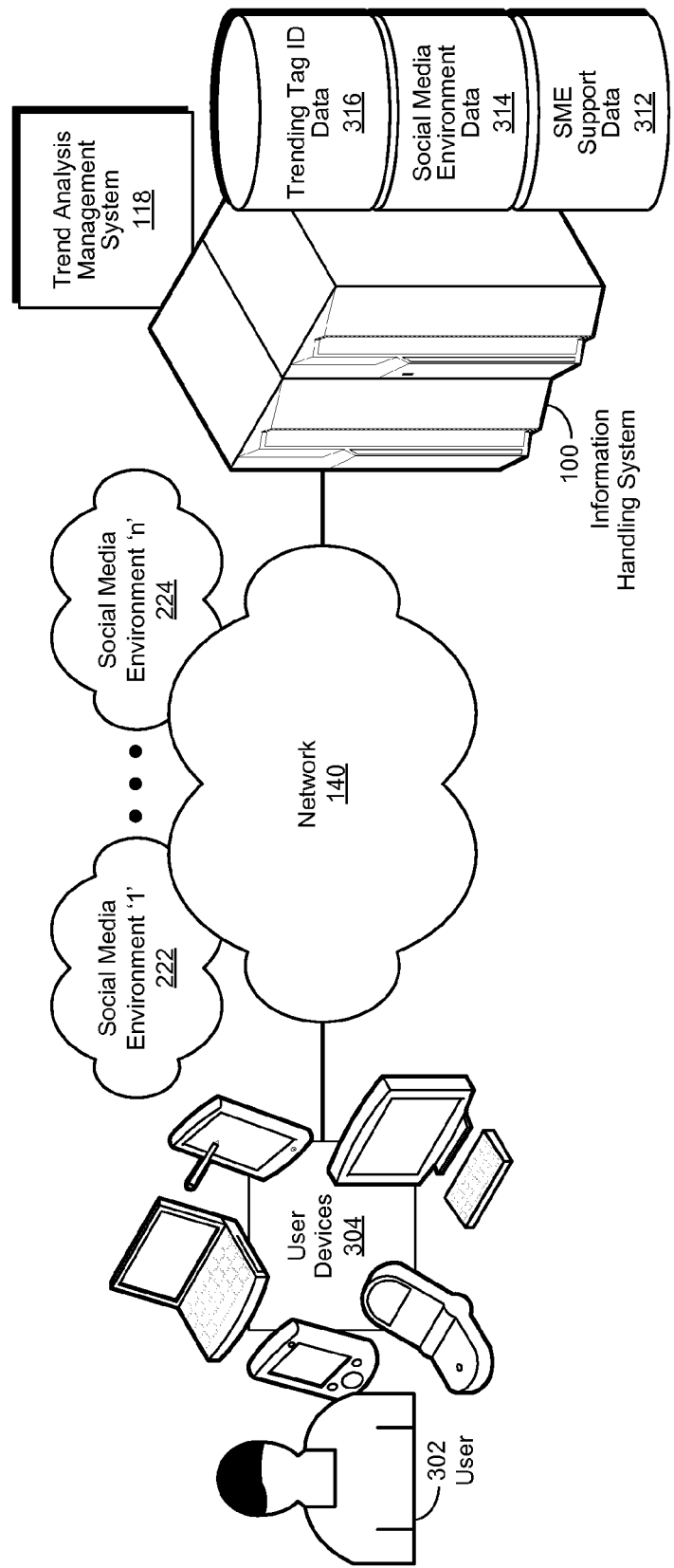
FIG. 3 shows a block diagram of an overview of a short message tag identification system environment.

FIG. 3 is a simplified block diagram of a short message tag identification environment implemented in accordance with an embodiment of the invention. In various embodiments, a user 302 may post information to a social media environment 'a' 222 through 'n' 224, which in turn may become a trending post. In various embodiments, the post information is based upon identified trending information and is identified via a suggested tag identifier. In these and other embodiments, the user 302 may use a user device 304 to post the information to a social media environment 'a' 222 through 'n' 224.

As used herein, a user device 304 refers to an information handling system such as a personal computer, a laptop computer, a tablet computer, a personal digital assistant (PDA), a smart phone, a mobile telephone, or other device that is capable of communicating and processing data. In various embodiments, the user device 304 is used to exchange information between the user 302 and a social media environment 'a' 222 through 'n' 224 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In this embodiment, a short message tag identification system 118 is implemented on an information handling system 100 to monitor interactions conducted within a social media environment 'a' 222 through 'n' 224 for any trending short message tag identifiers. In various embodiments the information handling system 100 may include repositories of subject matter expert (SME) support data 312, social media environment data 314, and trending short message tag identification data 316. In these various embodiments, the network 140 is used by the short message tag identification system 118 to monitor the social media environments '1' 222 through 'n' 224 for tag identification information as well as trending tag identification data.

The retrieved information is then parsed to determine various associated information, such as the short message tag identifiers and its details. The information, along with its parsed information, is then stored in a database associated with the short message tag identification system 118. In various embodiments, the retrieved information, along with its parsed information, may be stored in the repositories of social media environment data 314, and trending short message tag identification data 316. The retrieved information along with their associated data, are then processed by the short message tag identification system 118.

In various embodiments, the identified short message tag identifiers are formatted in a predetermined communication format for delivery to a user device 304. In certain embodiments, the communication format may be an email message, an Instant Messenger (IM) message, a Short Message Service (SMS) text, and so forth.

Figure 4:
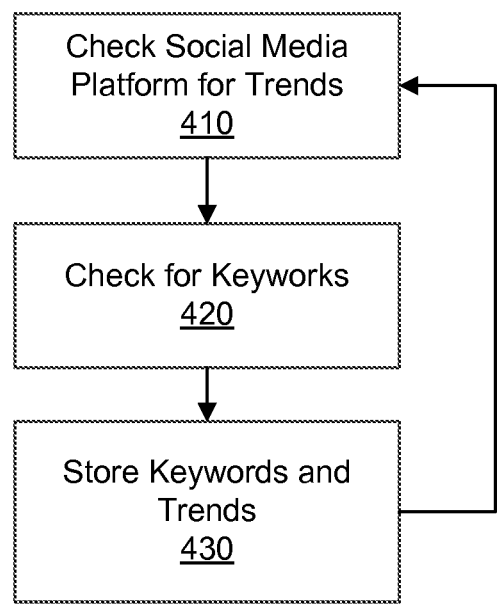
FIG. 4 shows a flow chart of the operation of a short message tool when performing a short message tag identification analysis of short messages.

FIG. 4 shows a flow chart of the operation of a short message tag identification tool 210 when performing a short message tag identification analysis of short messages. In certain embodiments, the short message tag identification analysis includes identification of trending short message tag identifiers which are associated with one or more keywords of interest. More specifically, the analysis begins at step 410 by accessing a social media platform and checking the social media platform for any trends. Next, at step 420, the short message tag identification tool 210 checks any of the identified trends for certain predefined keywords. In various embodiments, the keywords are related to a product of a company or a line of business of a company. Next at step 430, the short message tag identification tool 210 stores any identified keywords and/or identified trends within a short message tag identification repository. In certain embodiments the short message tag identification repository includes the trending tag identification data repository 316.

Figure 5:
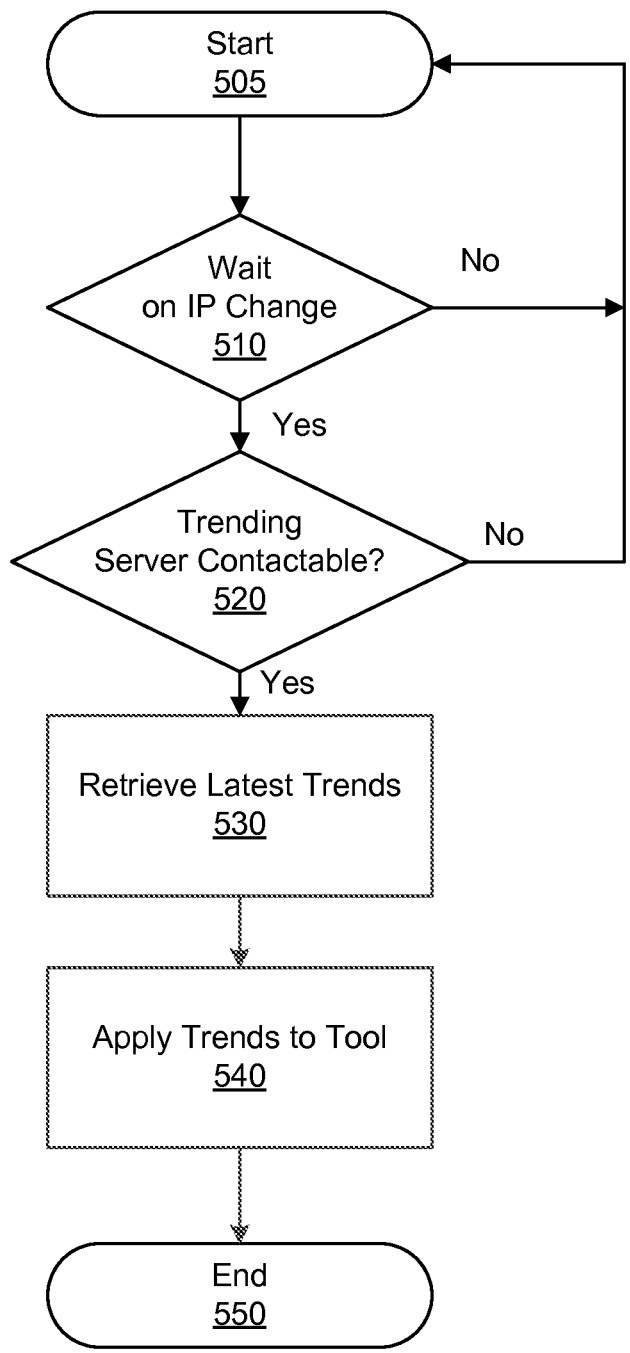
FIG. 5 shows a flow chart of the operation of the short message tool retrieving trending information from a social media platform.

FIG. 5 shows a flow chart of the operation of the short message tag identification tool 210 for retrieving trending information from a social media platform server and storing the retrieved information within the short message tag identification tool 210. More specifically, the operation starts at step 505 and proceeds to wait on an internet protocol (IP) change within the client system at step 510. If there is no IP change, then the operation returns to the start step 505. If there is an IP change, then the operation proceeds to step 520 during which the short message tag identification tool 210 determines whether the trending server is contactable. If the trending server is not contactable, then the operation returns to the start step 505. If the trending server is contactable, then the operation proceeds to retrieve the latest trends from the social media platform server at step 530. For the purposes of this disclosure, latest trends may be defined as any identified trends which have occurred since a previous access to the social media platform server. Next, at step 540, the retrieved latest trends are stored to the short message tag identification tool 210. In certain embodiments, these trends may be stored within the data repository 316.

Figure 6:
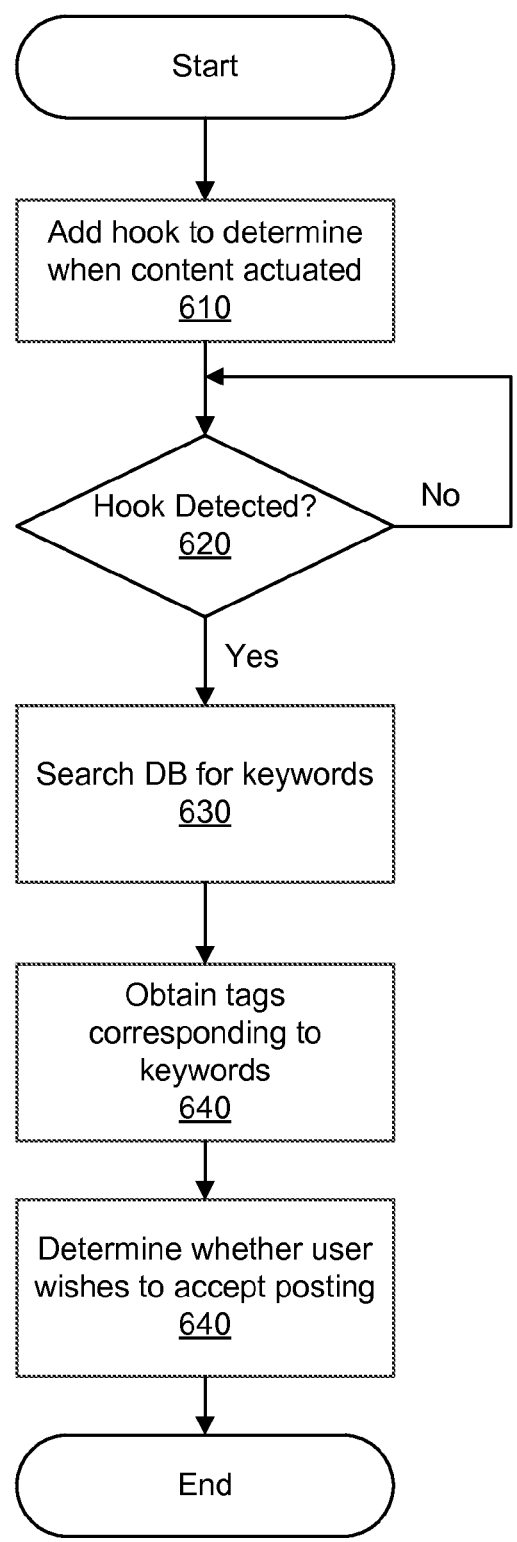
FIG. 6 shows a flow chart of the operation of a short message tool for applying identified trending short message tag identification information.

FIG. 6 shows a flow chart of the operation of the short message tag identification tool 210 for applying identified trending short message tag identification information. More specifically, the operation begins at step 610 with the short message tag identification tool 210 adding a hook to determine when particular text is actuated by a user. For the purposes of this disclosure, a hook is a mechanism to identify an action which is being performed by a user (e.g., to identify when particular text is actuated). In certain embodiments, the content includes a particular text passage (i.e., one or more words or phrases) which is associated with an area of importance for the company. After the hook is added, the short message tag identification tool 610 monitors the user device (e.g., user device 304) to determine when a hook is detected at step 620. The monitoring continues until one of the hooks is detected. When a hook is detected, then the short message tag identification tool 210 searches a database (e.g., the repository 316) for keywords that are associated with the hook at step 630. Next at step 640, the short message tag identification tool 210 obtains short message tag identifiers which are associated with and/or correspond to the keywords and provides the short message tag identifiers to the user. Next at step 650, the short message tag identification tool 210 determines whether a user wishes to accept a proposed short message tag identifier and use the proposed short message tag identifier when posting the content.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a short message tag identification operation, comprising:
    monitoring a social media platform for a trending short message tag identifier, the monitoring being based upon content of interest;
    determine when a user is generating a short message containing content of interest; and,
    automatically generating a proposed short message tag identifier based upon short message content, the proposed short message tag identifier taking into account the trending short message tag identifier; and wherein
    the automatically generating takes into account other short message tag identifiers being generated by a particular company so as to provide short message tag identifier synergy across a plurality of company owned short message accounts; and
    the automatically generating takes into account and consistently maintains a plurality of short message tag identifiers across a particular brand of the particular company.

2. The method of claim 1, wherein:
    the automatically generating takes into account other short message tag identifiers being generated across a plurality of short message accounts.

3. The method of claim 1, wherein:
    the automatically generating maintains a consistent resemblance across a plurality of short message identifiers.

4. The method of claim 1, wherein:
    the monitoring, collecting and automatically generating are performed via a principal agent, the principal agent collecting short message tag identification information from a plurality of social media streams, the short message tag identification information from the plurality of social media streams being stored within a short message tag identification information repository, the short message tag identification repository also storing information regarding trends and tag identifiers.

5. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        monitoring a social media platform for a trending short message tag identifier, the monitoring being based upon content of interest;
        determine when a user is generating a short message containing content of interest; and,
        automatically generating a proposed short message tag identifier based upon short message content, the proposed short message tag identifier taking into account the trending short message tag identifier; and wherein
        the automatically generating takes into account other short message tag identifiers being generated by a particular company so as to provide short message tag identifier synergy across a plurality of company owned short message accounts; and
        the automatically generating takes into account and consistently maintains a plurality of short message tag identifiers across a particular brand of the particular company.

6. The system of claim 5, wherein:
    the automatically generating takes into account other short message tag identifiers being generated across a plurality of short message accounts.

7. The system of claim 5, wherein:
    the automatically generating maintains a consistent resemblance across a plurality of short message identifiers.

8. The system of claim 5, wherein computer program code further comprises instructions executable by the processor and configured for:
    the monitoring, collecting and automatically generating are performed via a principal agent, the principal agent collecting short message tag identification information from a plurality of social media streams, the short message tag identification information from the plurality of social media streams being stored within a short message tag identification information repository, the short message tag identification repository also storing information regarding trends and tag identifiers.

9. A non-transitory, computer-readable storage medium embodying computer program code, the computer program code comprising computer executable instructions configured for:
    monitoring a social media platform for a trending short message tag identifier, the monitoring being based upon content of interest;
    determine when a user is generating a short message containing content of interest; and,
    automatically generating a proposed short message tag identifier based upon short message content, the proposed short message tag identifier taking into account the trending short message tag identifier; and wherein
    the automatically generating takes into account other short message tag identifiers being generated by a particular company so as to provide short message tag identifier synergy across a plurality of company owned short message accounts; and
    the automatically generating takes into account and consistently maintains a plurality of short message tag identifiers across a particular brand of the particular company.

10. The non-transitory, computer-readable storage medium of claim 9, wherein
    the automatically generating takes into account other short message tag identifiers being generated across a plurality of short message accounts.

11. The non-transitory, computer-readable storage medium of claim 9, wherein:
   the automatically generating maintains a consistent resemblance across a plurality of short message identifiers.

12. The non-transitory, computer-readable storage medium of claim 9, wherein the computer program code further comprises computer executable instructions configured for:
   the monitoring, collecting and automatically generating are performed via a principal agent, the principal agent collecting short message tag identification information from a plurality of social media streams, the short message tag identification information from the plurality of social media streams being stored within a short message tag identification information repository, the short message tag identification repository also storing information regarding trends and tag identifiers.

* * * * *